United States Patent [19]
Ward

[11] Patent Number: 5,482,000
[45] Date of Patent: Jan. 9, 1996

[54] SURFACE MOUNT OVERHEAT INDICATOR WITH PROJECTING FUSIBLE DISK

[75] Inventor: Michael S. Ward, Liberty, Mo.

[73] Assignee: Patent Master, Inc., Kansas City, Mo.

[21] Appl. No.: 259,901

[22] Filed: Jun. 15, 1994

[51] Int. Cl.⁶ .............................. G01K 1/02; G01K 11/00
[52] U.S. Cl. .............................................. 116/217; 374/160
[58] Field of Search .................................... 116/206, 207, 116/216, 217, 218, 219; 374/160, 162, 208; 426/88; 156/295, 297

[56] References Cited

U.S. PATENT DOCUMENTS

| | | | |
|---|---|---|---|
| 1,345,767 | 7/1920 | Hammond | 116/217 |
| 3,243,303 | 3/1966 | Johnson | 116/217 |
| 4,132,464 | 1/1979 | Maeno | 374/162 |
| 4,279,152 | 7/1981 | Crossland | 116/217 |
| 4,346,762 | 8/1982 | Tovim | 168/4 |
| 4,857,130 | 8/1989 | Curtis | 156/295 |

Primary Examiner—William A. Cuchlinski, Jr.
Assistant Examiner—Andrew Hirshfeld
Attorney, Agent, or Firm—Litman, McMahon and Brown

[57] ABSTRACT

A surface mount overheat indicator device includes a flattened annular outer frame and an inner fusible disk positioned within the outer frame. The fusible disk is formed of a material which melts at a selected temperature. The outer frame has a plurality of adhesive relief apertures formed therethrough in circumferentially spaced relation. The fusible disk projects rearwardly of a rear surface of the outer frame to define an adhesive receiving space between the rear surface of the outer frame and a surface on which the device is adhesively installed. The adhesive receiving space and the adhesive relief apertures cooperate to prevent the positioning of a layer of adhesive or a pocket of air between the fusible disk and the surface on which the device is installed to avoid interfering with the transfer of heat therefrom.

9 Claims, 1 Drawing Sheet

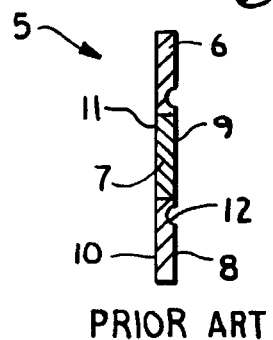
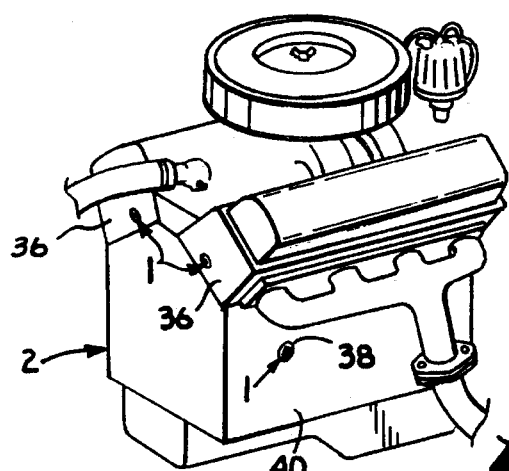
Fig.1.
PRIOR ART
Fig.2.
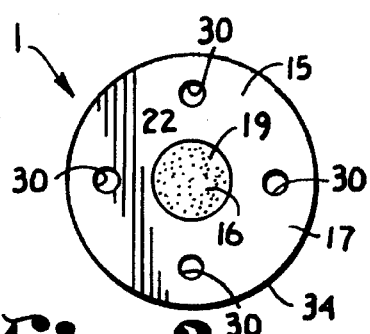
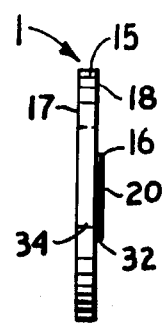
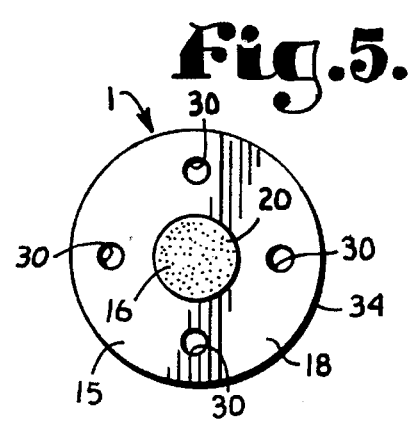
Fig.3.   Fig.4.   Fig.5.
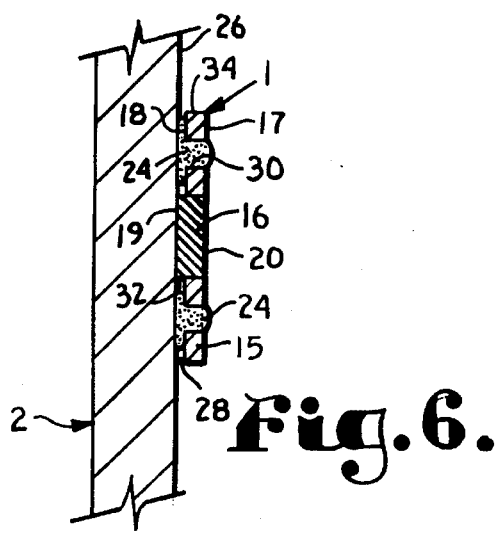
Fig.6.

5,482,000

SURFACE MOUNT OVERHEAT INDICATOR WITH PROJECTING FUSIBLE DISK

BACKGROUND OF THE INVENTION

Heat is generated within internal combustion engines, principally from the compression and combustion of the fuel and air mixture and, additionally, from the friction of engine parts moving relative to one another, most notably the piston rings and cylinder walls. In conventional automotive engines, the engine heat is removed by transfer to a coolant liquid flowing through a water or coolant jacket of the engine and from the coolant to the ambient atmosphere in the "radiator" or coolant-to-air heat exchanger.

As the engine operating time increases, frictional wear between mutually moving parts loosens the fit between such parts, such that the proportion of heat generated by friction decreases. At the same time that engine wear is occurring, the cooling efficiency of the radiator and cooling system is decreasing due to corrosion, the deposit of contaminants within the coolant onto the internal surfaces of the various passages of the cooling system, and other factors. Thus, the loss in cooling efficiency is normally balanced by a decrease in cooling requirements from the reduction in frictionally generated heat.

Although the great majority of automobile engines are discarded when worn out, along with the vehicles in which they are installed, worn engines are sometimes rebuilt if the vehicle body is otherwise viable. Also, if an engine fails early in the life cycle of a vehicle, it is often more economical to replace the engine than to buy a replacement vehicle. Such replacements are often rebuilt engines, although new engines are also used as replacements.

When engines are rebuilt, components which have been worn by friction are replaced or remachined, as appropriate. This usually involves resurfacing of the cylinder walls and the installation of oversized pistons and rings, along with the replacement of bearings and bearing structures. A new engine or a rebuilt engine is frictionally "tighter" than a worn engine such that frictionally generated heat is also greater. It is generally recommended that the cooling system of a relatively older vehicle be replaced or carefully checked when a rebuilt or new engine is installed because of the increased cooling requirements of a tighter engine. If a new or rebuilt engine is installed in a vehicle with an inadequate cooling system, engine failure resulting from overheating can occur. It should be noted that rebuilt engine failures can result from other factors which may be attributable to the engine rebuilder, the rebuilt engine installer, or to the vehicle operator.

In order to protect themselves from unfair warranty claims related to such engine failures, some engine rebuilders install heat indicator tabs at various locations on the block and heads of rebuilt engines to indicate if the engine has experienced overheating. One well known type of heat indicator tab is a small disk formed by an outer ring frame surrounding a center disk of a metal that melts at a temperature which would indicate overheating of the engine. The fusible disk may, for example, be an alloy of bismuth and lead in equal proportions, which melts at about 250° F. The tab assembly is installed on a cleaned engine surface using a high temperature tolerant adhesive. Ideally, contact between the engine surface and the fusible disk allows engine heat to be transferred to the fusible disk. If the engine reaches an operating temperature which exceeds the melting temperature of the fusible disk, it melts and drains away from the heat indicator tab, giving visible evidence of overheating.

One functional problem with such conventional heat indicator tabs is that if they are not installed carefully, a layer of adhesive can be left between the heat indicator tab and the engine surface which can form a heat insulator therebetween. Another possibility is that an air pocket can be left between the fusible disk and the surface of the engine to be monitored which can also act as an insulator therebetween. In either case, the engine may overheat and fail before the fusible disk reaches its melting point.

SUMMARY OF THE INVENTION

The present invention is an improved engine overheat indicator with provisions to reduce the likelihood of the fusible disk of an installed indicator device being insulated from the surface of the engine to be monitored. The overheat indicator of the present invention is formed by a flattened outer ring or frame having front and rear surfaces and a central fusible disk formed of a material which melts at a selected temperature, such as a 50/50% alloy of lead and bismuth, which melts at about 250° F.

In the present invention, the fusible disk has a thickness somewhat greater than the thickness of the outer frame and is positioned therein such that a small portion of the fusible disk projects rearward beyond the rear surface of the outer frame. This provides an adhesive receiving space around the fusible disk when installed on a surface, which lessens the tendency of the adhesive to flow between the fusible disk and the surface to be monitored or to leave air spaces therebetween. Additionally, the heat indicator of the present invention has a plurality of adhesive relief apertures formed through the outer frame at circumferentially spaced locations thereon. The relief apertures allow excess adhesive to easily flow therethrough to further prevent adhesive or air pockets from insulating the fusible disk from the surface of the engine component to be temperature monitored.

OBJECTS AND ADVANTAGES OF THE INVENTION

The principal objects of the present invention are: to provide an improved temperature indicating device; to provide such a device which visibly indicates the detection that the temperature of a component on which the device is mounted has exceeded a selected temperature; to provide such a device which is particularly adapted for installation on an automotive engine component to indicate that an overheated condition has occurred within the engine; to provide such a device which is adapted for installation on the surface of an engine component using a high temperature tolerant adhesive; to provide such a device formed by a flattened, annular outer frame and a center fusible disk of an alloy which melts at the overheat temperature of interest; to provide such a device which is adapted to avoid the insulation of the fusible disk from the surface on which the device is mounted by a layer of the adhesive or an air pocket; to provide such a device in which the fusible disk projects slightly beyond the rear surface of the outer frame to form an adhesive receiving space about the fusible disk between the outer frame and the surface on which the device is mounted; to provide such a device including a plurality of adhesive relief apertures formed through the outer frame in circumferentially spaced relation to allow excess adhesive to flow therethrough; to provide such a device in which the projecting fusible disk and adhesive relief apertures cooperate to ensure that the rear surface of the fusible disk is in heat transferring contact with the surface on which the device is mounted by controlling the flow of the adhesive during installation of the device on the surface of the engine component to be monitored; and to provide such an overheat indicating device which is economical to manufacture; which is effective and precise in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an enlarged cross sectional view of a prior art heat indicator tab.

FIG. 2 is a simplified perspective view of an engine having overheat indicators embodying the present invention installed thereon.

FIG. 3 is an enlarged front elevational view of the overheat indicator according to the present invention.

FIG. 4 is an enlarged side elevational view of the overheat indicator.

FIG. 5 is an enlarged rear elevational view of the overheat indicator.

FIG. 6 is an enlarged cross sectional view of the overheat indicator of the present invention shown adhesively mounted on a surface for overheat monitoring purposes.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a surface mount overheat indicator device which embodies the present invention. The indicator device 1 is adapted for installation on components of an automotive engine 2 to detect and visibly indicate the occurrence of an overheat condition during operation of the engine 2.

FIG. 1 illustrates a prior art overheat indicator tab 5. The tab 5 includes a flattened, annular outer frame 6 surrounding a center fusible disk 7. The outer frame 6 has a rear surface 8, and the disk 7 has a rear surface 9. The tab 5 is adapted for adhesive installation on an engine 2 with the rear surface 9 of the disk 7 contacting a surface of the engine 2 to enable the transfer of heat therefrom. As illustrated, the rear surface 9 of the disk 7 and the rear surface 8 of the outer frame 6 are coplanar. Similarly, respective front surfaces 10 and 11 of the outer frame 6 and disk 7 are also coplanar. The rear surface 8 of the outer frame 6 may include a circular groove 12 which is provided to receive a quantity of adhesive (not shown) which attaches the tab 5 to a surface of an engine 2.

FIGS. 2–6 illustrate the overheat indicator device 1 of the present invention. The device 1 includes a flattened, annular outer frame 15 surrounding a fusible disk 16 positioned in the center of the frame 15. The outer frame 15 has a front surface 17 and a rear surface 18, while the disk 16 has a rear surface 19 and a front surface 20. The outer frame 15 may be formed of a material which has a melting point considerably higher than that of the disk 15, such as aluminum or another metal. The disk 16 is formed of a material which melts at a selected temperature, such as an alloy of lead and bismuth. The disk 16 may be assembled with the outer frame 15, as by being pressed into a central aperture 22 formed in the center of the outer frame 15.

The precise melting point of the disk 16 can be controlled to some extent by varying the proportions of the constituent metals. For the purpose of detecting an overheated condition of a conventional automobile engine 2, a temperature in the range of 250°–260° F (120°–127° C.) is of interest. An alloy of equal proportions of lead and bismuth has a melting point of about 257°–259° F (125°–126° C.) and would, thus, be suitable for the primary use intended for the device 1 of the present invention. Alternatively, other materials with higher or lower melting temperatures could be used for the device 1, depending upon the intended use of the device 1.

The overheat indicator device 1 of the present invention is provided with features which greatly reduce the likelihood of a layer of adhesive 24 or an air pocket being positioned between the rear surface 19 of the fusible disk 16 and the surface 26 of a component of the engine 2 during installation of the device on the engine 2. Such a layer of adhesive 24 or an air pocket would insulate the fusible disk 16 from the surface 26 and, thereby, interfere with the transfer of heat therefrom. Such insulation caused by a layer of adhesive or an air pocket is known to have occurred in use of the prior art heat indicator 5 of FIG. 1.

In the device 1, the fusible disk 16 projects rearwardly beyond the rear surface 18 of the outer frame 15 to define an annular adhesive receiving space 28 (FIG. 6) between the rear surface 18 of the outer frame 15 and the surface 26 of the engine component on which the device 1 is installed. The extent of projection of the fusible disk 16 beyond the rear surface 18 of the outer frame 15 is preferably about 0.6 millimeter. Additionally, a plurality of adhesive relief apertures 30 are formed through the outer frame 15 in circumferentially spaced relation about the fusible disk 16. The rear projection 32 of the fusible disk 16 and the apertures 30 cooperate to provide a space for the adhesive 24 and to allow any excess adhesive 24 to flow either through the adhesive relief apertures 30 or radially outward past an outer peripheral edge 34 of the outer frame 15. These provisions of the device 1 of the present invention greatly increase the accuracy of installation of the device 1 and ensure that the rear surface 19 of the fusible disk 16 is positioned in thermally coupled contact with the surface 26 of the component of the engine 2 on which the device 1 is installed.

The overheat indicator device 1 of the present invention is installed in multiple locations on the engine 2 which may be subjected to high temperatures during operation of the engine 2, such as on opposite ends of a cylinder head or heads 36. Additionally, it is desirable to install a device 1 on a part of the engine which is in contact with the engine coolant, such as on one or more freeze plugs 38 positioned in a cylinder block 40 of the engine 2. The location of a plurality of heat indicator devices 1 on the engine 2 can provide important clues in the diagnosis of the cause of a failure of the engine 2, especially if localized or generalized overheating of the engine 2 is suspected.

It is to be understood that while certain forms of the present invention have been illustrated and described herein, it is not to be limited to the specific forms or arrangement of parts described and shown. In particular, while the overheat indicator device 1 has been principally described with respect to an automotive engine 2, the device 1, with the improvements of the present invention, has utility in indicating overheat conditions in other applications. Therefore, the overheat indicator device 1 of the present invention is not intended to be limited to use only on automotive engines.

What is claimed and desired to be secured by Letters Patent is as follows:

1. An overheat indicator adapted for adhesive mounting on a test surface to indicate an overheat condition of said test surface and comprising:

(a) an indicator frame;

(b) a fuse member positioned within said frame such that when said indicator frame is adhesively attached to said test surface, the fuse member directly engages said test surface to enable transfer of heat therefrom, said fuse member being formed of a material which melts at a selected temperature of said test surface in contact therewith; and (c) at least one adhesive relief aperture formed in said frame to enable the flow therethrough of an adhesive used to mount said indicator on said test surface to prevent said adhesive from insulating said fuse member from the test surface.

2. An indicator as set forth in claim 1 wherein:

(a) said indicator frame is a flattened annular member; and (b) said fuse member is a disk shaped member.

3. An indicator as set forth in claim 2 wherein there are a plurality of said adhesive relief apertures formed through said frame and positioned about said fuse member.

4. An indicator as set forth in claim 1 wherein:

(a) said frame has a contact mounting surface; and (b) said fuse member includes a projecting portion extending beyond said contact mounting surface to form an adhesive receiving space between said contact mounting surface and said test surface on which said indicator is to be mounted to enable effective heat transfer contact between said test surface and said fuse member and to avoid insulation of said fuse member from said contact with said test surface by interposition of said adhesive therebetween.

5. An overheat indicator for indicating an overheat condition of a test surface, said indicator being adapted for adhesive mounting on said test surface and comprising:

(a) an indicator frame having a contact mounting surface;

(b) a fuse member positioned within said frame such that when said frame is adhesively attached to said test surface, the fuse member directly engages said test surface to enable transfer of heat therefrom, said fuse member being formed of a material which melts at a selected temperature of said test surface in contact therewith; and (c) said fuse member includes a projecting portion extending beyond said contact mounting surface to form an adhesive receiving space between said contact mounting surface and test surface on which said indicator is to be mounted to enable effective heat transfer contact between said test surface and said fuse member and to avoid insulation of said fuse member from said contact with said test surface by interposition of an adhesive therebetween.

6. An indicator as set forth in claim 5 wherein:

(a) said indicator frame is a flattened annular member; and (b) said fuse member is a disk shaped member.

7. An indicator as set forth in claim 5 and including a plurality of adhesive relief apertures formed in said frame to enable the flow therethrough of said adhesive used to mount said indicator on said test surface to prevent said adhesive from insulating said fuse member from the test surface.

8. An indicator as set forth in claim 7 wherein said plurality of adhesive relief apertures are positioned about said fuse member.

9. An overheat indicator for indicating an overheat condition of a test surface, said indicator being adapted for adhesive mounting on said test surface and comprising:

(a) a flattened annular indicator frame having a front surface and an opposite contact mounting surface;

(b) a plurality of adhesive relief apertures formed through said frame and positioned circumferentially thereabout to enable the flow therethrough of an adhesive used to mount said indicator on said test surface;

(c) a disk shaped fuse member positioned within said frame such that when said frame is adhesively attached to said test surface, said fuse member directly engages said test surface to enable transfer of heat therefrom, said fuse member being formed of a material which melts at a selected temperature; and (d) said fuse member includes a projecting portion extending beyond said contact mounting surface to form an adhesive receiving space between said contact mounting surface and said test surface on which said indicator is to be mounted, said projecting portion of said fuse member and said adhesive relief apertures cooperating to enable effective heat transfer contact between said test surface and said fuse member and to avoid insulation of said fuse member from said contact with said test surface by interposition of said adhesive therebetween.

\* \* \* \* \*